United States Patent
Kono et al.

(10) Patent No.: US 9,284,452 B2
(45) Date of Patent: Mar. 15, 2016

(54) CONNECTION STRUCTURE FOR PHOTOVOLTAIC POWER GENERATION MODULE

(75) Inventors: Hiroyuki Kono, Tokyo (JP); Tadayuki Ishii, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 922 days.

(21) Appl. No.: 13/125,675

(22) PCT Filed: Oct. 22, 2009

(86) PCT No.: PCT/JP2009/005572
§ 371 (c)(1),
(2), (4) Date: Jun. 10, 2011

(87) PCT Pub. No.: WO2010/047122
PCT Pub. Date: Apr. 29, 2010

(65) Prior Publication Data
US 2011/0232963 A1 Sep. 29, 2011

(30) Foreign Application Priority Data

Oct. 24, 2008 (JP) ................. 2008-274459

(51) Int. Cl.
| H01L 31/048 | (2014.01) |
| C08L 53/02 | (2006.01) |
| C08L 71/12 | (2006.01) |
| H02S 40/34 | (2014.01) |
| C08L 25/06 | (2006.01) |
| C08L 51/04 | (2006.01) |

(52) U.S. Cl.
CPC ............... *C08L 71/12* (2013.01); *H02S 40/34* (2014.12); *C08L 25/06* (2013.01); *C08L 51/04* (2013.01); *C08L 53/025* (2013.01)

(58) Field of Classification Search
USPC .......................................... 439/500; 525/98
See application file for complete search history.

(56) References Cited

U.S. PATENT DOCUMENTS

| 7,371,790 B2 | 5/2008 | Yoshida et al. |
| 2001/0001424 A1 | 5/2001 | Sasaoka |
| 2002/0193001 A1 | 12/2002 | Yoshikawa et al. |
| 2004/0173373 A1* | 9/2004 | Wentworth et al. ............ 174/92 |
| 2004/0235993 A1 | 11/2004 | Yoshida et al. |
| 2007/0275242 A1* | 11/2007 | Gopal et al. .................. 428/401 |
| 2008/0190477 A1 | 8/2008 | Hattori |
| 2012/0222273 A1* | 9/2012 | Abbott et al. .................. 24/522 |

FOREIGN PATENT DOCUMENTS

| CN | 1605601 A | 4/2005 |
| EP | 0 867 947 A2 | 9/1998 |
| JP | 63-301222 | 12/1988 |
| JP | 05-001253 | 1/1993 |
| JP | 6-57128 | 3/1994 |
| JP | 7-48506 | 2/1995 |
| JP | 10-316847 | 12/1998 |
| JP | 2005-72395 | 3/2005 |
| JP | 2006-299235 | 11/2006 |
| JP | 2008-251856 | 10/2008 |
| JP | 2008-274035 | 11/2008 |
| WO | WO 2005/117141 A1 | 12/2005 |

OTHER PUBLICATIONS

European Search Report dated Apr. 3, 2014 for European Application No. 09821822.5 (3 pages).
UL 1703 Flat-Plate Photovoltaic Modules and Panels, Underwriters Laboratories Inc. (UL) Third Edition, Mar. 15, 2002, Revisions dated Apr. 8, 2008, pp. 2/ 83-83/ 83 and 1/ 2-2/ 2. (anonymous).
International Preliminary Report on Patentability dated May 26, 2011 issued in corresponding International Application No. PCT/JP2009/005572.
Office Action for CN Application No. 200980142098 mailed Feb. 16, 2013.
International Search Report from Japanese Patent Office for International Application No. PCT/JP2009/005572, Mailed Dec. 22, 2009.

* cited by examiner

*Primary Examiner* — Jeffrey Mullis
(74) *Attorney, Agent, or Firm* — Finnegan, Henderson, Farabow, Garrett & Dunner, L.L.P.

(57) ABSTRACT

To provide a connection structure for a photovoltaic power generation module which is excellent in long-term heat resistance and which is excellent in low-temperature impact resistance even if the structure is reduced in wall thickness and size. There is provided a connection structure (1) for a photovoltaic power generation module which at least joins a photovoltaic power generation module to a cable for connecting to the photovoltaic power generation module, the connection structure for the photovoltaic power generation module comprising a thermoplastic resin composition having, as an index of long-term heat resistance, a relative thermal index (RTI) of tensile impact strength at a thickness of 1.5 mm of 115° C. or higher, and a Charpy impact strength at −40° C. of 6.5 kJ/m$^2$ or more.

11 Claims, 2 Drawing Sheets

FIG. 1

CONNECTION STRUCTURE FOR PHOTOVOLTAIC POWER GENERATION MODULE

TECHNICAL FIELD

The present invention relates to a connection structure for a photovoltaic power generation module.

BACKGROUND ART

In a photovoltaic power generation module (hereinafter, sometimes referred to simply as a "module") which transforms solar light energy into electricity, a junction box and a connector for connecting a cable between modules are provided for each module, in order to take out the electricity in a useful form. In the junction box, a by-pass diode or the like are arranged, which is a device for minimizing the influence of reduction in the output of the photovoltaic power generation module caused by a partial shadow cast on the surface of the module or a failure of a battery cell. In this case, since the by-pass diode generates heat, it is required that the whole junction box have heat resistance. As measures for such heat generation, there are proposed methods of increasing the number of diodes, attaching a metal heat-dissipating plate to the by-pass diode for thermal conduction, or enlarging the volume of the junction box to radiate the heat (refer to Patent Literatures 1 and 2).

The junction box, which may also be installed in the outdoors such as on a roof as an attachment of the photovoltaic power generation module, is required to have impact resistance against a flying object and is particularly required to have impact resistance even at low temperatures. In order to improve the impact resistance of the junction box, the wall thickness of the product has been increased, or the box has been enlarged. Similar to the junction box, impact resistance is required also for the connector for a photovoltaic power generation module.

Patent Literature 1: International Publication No. WO 2005/117141

Patent Literature 2: Japanese Utility Model Laid-Open No. 05-001253

DISCLOSURE OF INVENTION

Problems to be Solved by the Invention

However, with an increase in the need for addressing environmental problems, many different photovoltaic power generation systems have been developed and a connection structure such as a junction box and a connector has also been required for good design and reduction in space, but the good design and reduction in space have not yet been sufficiently achieved. For example, in the case of a junction box, if a heat-dissipating plate is installed or the wall thickness of the product is increased in order to improve high temperature rigidity as the measures for heat generation of a diode, the junction box will be increased in size. The wall thickness of the product is increased to improve the strength in terms of impact resistance against a flying object and the like. However, this does not sufficiently meet the need of good design and reduction in space. Furthermore, the life of the module is being increased by the improvement of the performance of a battery cell. As a result, a long-term heat resistance against the heat generation of a diode needs to be improved also for the junction box. Thus, it is required to further improve the long-term heat resistance of the junction box to thereby improve the reliability of the module in which it is incorporated. The same may be said in the case of the connector.

The present invention has been made in view of the above circumstances, and a main object of the present invention is to provide a connection structure for a photovoltaic power generation module which is excellent in long-term heat resistance and which is excellent in low-temperature impact resistance even if the structure is reduced in wall thickness and size.

Means for Solving the Problems

As a result of extensive investigations to solve the above problems, the present inventors have found that the above problems can be solved by providing a connection structure for a photovoltaic power generation module comprising a thermoplastic resin composition having, as an index of long-term heat resistance, a relative thermal index (RTI) of tensile impact strength at a thickness of from 1.5 mm of 115° C. or higher and a Charpy impact strength at −40° C. of 6.5 kJ/m$^2$ or more. Thus, the present invention has been completed.

That is, the present invention is as follows.

[1]

A connection structure for a photovoltaic power generation module, which at least joins a photovoltaic power generation module to a cable for connecting to the photovoltaic power generation module, the connection structure for the photovoltaic power generation module comprising a thermoplastic resin composition having, as an index of long-term heat resistance, a relative thermal index (RTI) of tensile impact strength at a thickness of 1.5 mm of 115° C. or higher, and a Charpy impact strength at −40° C. of 6.5 kJ/m$^2$ or more.

[2]

The connection structure for the photovoltaic power generation module of the [1], wherein the thermoplastic resin composition comprises a (A) polyphenylene ether, a (B) styrenic-based resin, and a (C) hydrogenated block copolymer, and based on 100 parts by mass of a total of the (A), the (B), and the (C), a content of the (A) is from 65 to 98 parts by mass;
a content of the (B) is from 1 to 25 parts by mass; and
a content of the (C) is from 1 to 20 parts by mass.

[3]

The connection structure for the photovoltaic power generation module of the [1] or [2], wherein the thermoplastic resin composition has a relative thermal index of 120° C. or higher.

[4]

The connection structure for the photovoltaic power generation module of any one of the [1] to [3], wherein the thermoplastic resin composition has a Charpy impact strength at −40° C. of 7.5 kJ/m$^2$ or more.

[5]

The connection structure for the photovoltaic power generation module of any one of the [1] to [4], wherein the thermoplastic resin composition has a Dart impact strength at −40° C. of 3.0 J or more.

[6]

The connection structure for the photovoltaic power generation module of any one of the [1] to [5], wherein the thermoplastic resin composition has a retention of 70% or more, wherein the retention is defined as a ratio, in percentage, of the Dart impact strength at −40° C. after being left standing in a 90° C./saturated water vapor environment for 500 hours to the Dart impact strength at −40° C. before the standing.

[7]

The connection structure for the photovoltaic power generation module of any one of the [1] to [6], wherein the connection structure for the photovoltaic power generation module is a junction box for a photovoltaic power generation module.

[8]

The connection structure for the photovoltaic power generation module of the [7], wherein the connection structure has an average wall thickness of 1 mm or more and 2.5 mm or less.

[9]

The connection structure for the photovoltaic power generation module of any one of the [1] to [6], wherein the connection structure for the photovoltaic power generation module is a connector for a photovoltaic power generation module.

[10]

The connection structure for the photovoltaic power generation module of the [9], wherein the connection structure has an average wall thickness of 0.5 mm or more and 2.5 mm or less.

Advantageous Effects of the Invention

The present invention can provide a connection structure for a photovoltaic power generation module which is excellent in long-term heat resistance and which is excellent in low-temperature impact resistance even if the structure is reduced in wall thickness and size.

DESCRIPTION OF THE PREFERRED EMBODIMENTS

Hereinafter, the embodiments for carrying out the present invention (hereinafter referred to simply as "the present embodiments") will be described in detail. The present embodiments as described below are illustrations for describing the present invention, and are not intended to limit the present invention to the following contents. The present invention can be implemented by properly modifying the same within the scope of the gist of the invention. Note that the dimension ratios of the drawings are not limited to the ratios shown.

The connection structure for a photovoltaic power generation module in accordance with the present embodiments (hereinafter referred to simply as "connection structure") is a connection structure for a photovoltaic power generation module, which at least joins a photovoltaic power generation module to a cable for connecting to the photovoltaic power generation module, the connection structure for the photovoltaic power generation module comprising a thermoplastic resin composition having, as an index of long-term heat resistance, a relative thermal index (RTI) of tensile impact strength at a thickness of 1.5 mm of 115° C. or higher, and a Charpy impact strength at −40° C. of 6.5 kJ/m² or more.

Figure 1:
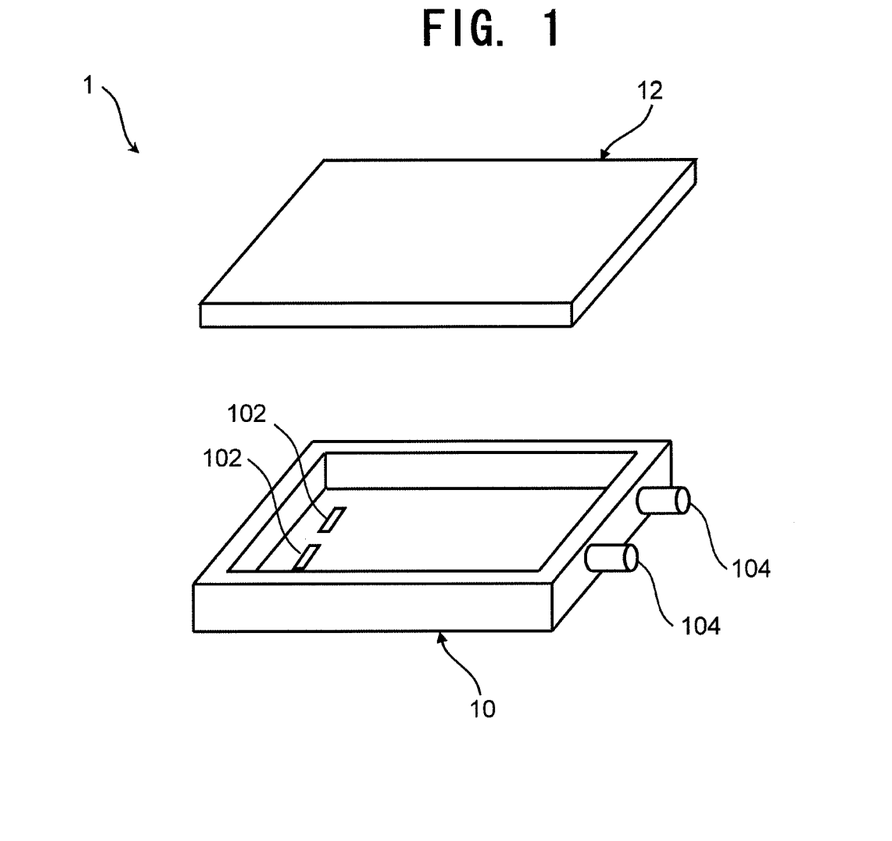
FIG. 1 shows a simple perspective view of a first embodiment of the connection structure for a photovoltaic power generation module in accordance with the present embodiments.

FIG. 1 shows a simple perspective view of a first embodiment of the connection structure in accordance with the present embodiments. The connection structure 1 comprises a box-shaped body 10 having an open upper surface and a lid 12 for covering the opening of the body 10. The connection structure 1 can be used as a junction box for a photovoltaic power generation module (hereinafter sometimes referred to simply as "junction box") which houses a by-pass diode, a diode for preventing back flow (not shown), and the like in the inner part of the body 10. The body 10 comprises a connection part 102 for connecting to a cable of the photovoltaic power generation module and a connection part 104 for connecting to an external connection cable. The connection structure 1 joins the photovoltaic power generation module to the external connection cable and the like. Thereby, the electric power generated in the photovoltaic power generation module can be supplied to an external device and the like. The cable for joining may be one or two or more, and a device to be joined is also not limited. Here, the connection structure 1 of the present embodiments may be a structure which can house at least a photovoltaic power generation module, and the structure is not particularly limited and may not be a structure in which the body 10 and the lid 12 are separated as shown in FIG. 1. The shape and the like of the connection structure 1 is not particularly limited, but can be properly selected in consideration of the size and shape of the module, a service condition, and the like.

The connection structure 1 of the present embodiments uses a thermoplastic resin composition having, as an index of long-term heat resistance, a relative thermal index (RTI) of tensile impact strength at a thickness of 1.5 mm of 115° C. or higher, and a Charpy impact strength at −40° C. of a specific value or more. This can provide a connection structure which is thin as compared with conventional ones, and can provide a connection structure which is excellent in heat resistance and low-temperature impact resistance in spite of having a reduced wall thickness and size. As a result, improvement in design, reduction in space, and the like are achieved for the connection structure 1. As a preferred aspect of the connection structure 1 of the present embodiments, the connection structure 1 preferably has an average wall thickness of 3 mm or less, more preferably from 1 mm to 2.5 mm. When a thin connection structure having an average wall thickness of 2.5 mm or less is provided, it will not be restricted by a disposition space and a production cost can be further reduced. When the average wall thickness is 1 mm or more, strength, long-term heat resistance, fluidity, and impact resistance at low temperatures can be designed with good balance, and long-term heat resistance against the heat generation of a diode can be maintained.

Here, the average wall thickness in the connection structure 1 means the average of the thickness of a flat surface and/or a curved surface including the main area of a top surface, a bottom surface, and a wall surface, in the body 10 and the lid 12. For example, with respect to a connector to be described below, the average wall thickness means the average of the thickness of a flat surface and/or a curved surface including the main area of a socket part which constitutes a cylindrical shape and a square pillar shape. Accordingly, the wall thickness of a local area such as a rib, a diode mounting part, a slit for fitting, a claw for fitting, and the like is not included in the average wall thickness.

A preferred aspect of the connection structure of the present embodiments includes a junction box for a photovoltaic power generation module, as described above. When the connection structure is used as a junction box, the average wall thickness in particular is preferably 1 mm to 2.5 mm. The present embodiment can provide a junction box which is thin as compared with conventional ones. Therefore, it is possible to provide a junction box which is excellent in long-term heat resistance and low-temperature impact resistance, although it has a reduced wall thickness and size. Conventionally, when a junction box had an average wall thickness as described above, it was difficult to design strength, long-term heat resistance, fluidity, and impact resistance at low temperatures with good balance, and it was impossible to maintain long-term heat resistance sufficiently against the heat generation of a diode, and the like. With respect to the junction box of the present embodiments, the above physical properties can be designed with good balance, and long-term heat resistance can be maintained.

Figure 2:
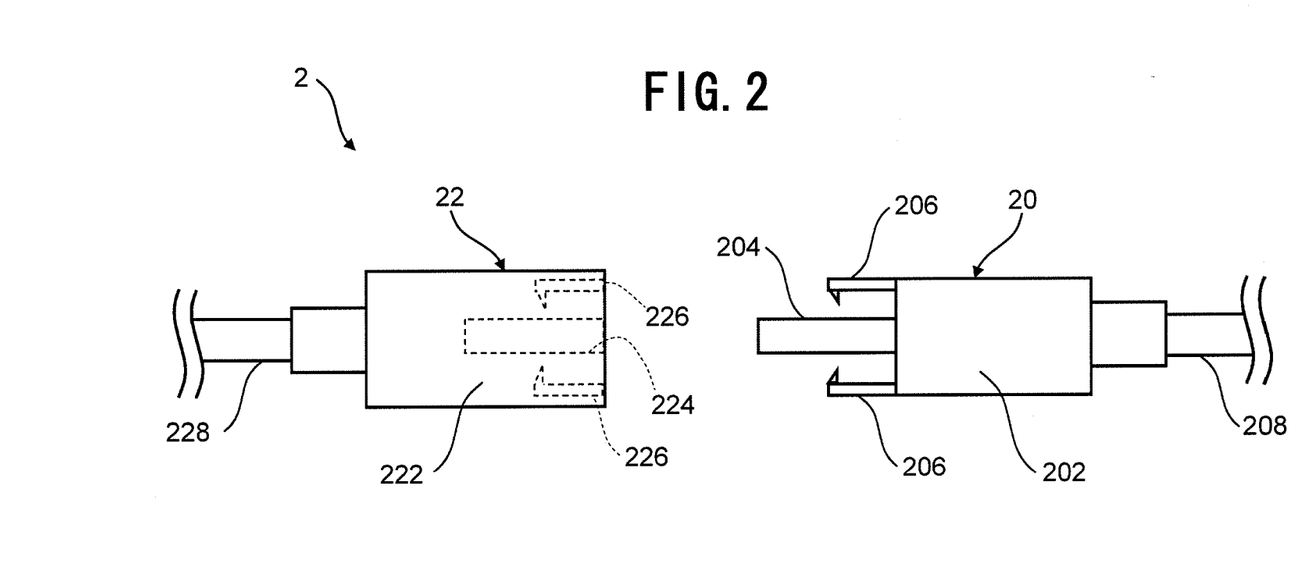
FIG. 2 shows a simple top view of a second embodiment of the connection structure for a photovoltaic power generation module in accordance with the present embodiments.

FIG. 2 shows a simple top view of a second embodiment of the connection structure in accordance with the present embodiments. The connection structure 2 comprises a first male connector 20 and a second female connector 22. Thus, another preferred aspect of the connection structure of the present embodiments can include a connector for a photovoltaic power generation module (hereinafter sometimes referred to simply as a "connector"). In the connection structure 2, the first connector 20 comprises a socket part 202, a connection terminal 204 projected from the socket part 202, a lock part 206 formed in the connecting direction with the connector 22, and a cable 208 connected to the socket part 202. The second connector 22 comprises a socket part 222 and a cable 228 connected to the socket part 222. A fitting hole 224 fitted with the connection terminal 204 of the first connector 20 and a lock-receiving part 226 fitted with the lock part 206 of the first connector 20 are formed in the socket part 222 of the second connector 22. The first connector 20 and the second connector 22 can be connected by inserting and fitting the lock part 206 of the first connector 20 into the lock-receiving part 226 of the second connector 22, while inserting the connection terminal 204 of the first connector 20 into the fitting hole 224 of the second connector 22.

In the connection structure 2, the shape of the first connector 20 and the second connector 22 may not be limited. For example, the socket part 202 of the first connector 20 and the socket part 204 of the second connector 22 may be cylindrical, or may be square pillar-shaped. The structure of the first connector 20 and the second connector 22 may not be limited. For example, a plurality of connection terminals 204 may be formed in the socket part 202 of the first connector 20, and a plurality of fitting holes 224 may be formed in the socket part 222 of the second connector 22. Further, any of the first connector 20 and the second connector 22 may be a connector for the positive electrode or may be a connector for the negative electrode.

As described above, when the connection structure is used as a connector, the average wall thickness is preferably from 0.5 mm to 2.5 mm. The present embodiments can provide a connector which is thin as compared with conventional ones. Therefore, it is possible to provide a connector which is excellent in long-term heat resistance and low-temperature impact resistance, although it has a reduced wall thickness and size. Particularly, when a connector had an average wall thickness as described above, it was conventionally difficult to design strength, long-term heat resistance, fluidity, and the like with good balance while sufficiently maintaining impact resistance at low temperatures. However, with respect to the connector of the present embodiments, the above physical properties can be designed with good balance, and long-term heat resistance can be maintained.

The connection structure in accordance with the present embodiments comprises a thermoplastic resin composition having, as an index of long-term heat resistance, a relative thermal index (RTI) of tensile impact strength at a thickness of 1.5 mm of 115° C. or higher and a Charpy impact strength according to ISO179/1eA at −40° C. of 6.5 kJ/m$^2$ or more.

In the present embodiments, the relative thermal index (RTI) as an index of long-term heat-resistance means a temperature at which the tensile impact strength of the thermoplastic resin composition is reduced to 50% of the initial physical property value when it is used in the atmosphere at a constant temperature for 100,000 hours. In the present embodiments, there is used a thermoplastic resin composition having a relative thermal index (RTI) of tensile impact strength at a thickness of 1.5 mm of 115° C. or higher. A material having a known RTI is used as a correlation sample, and the time to 50% retention is determined at a plurality of ambient temperatures based on the Arrhenius rule. Then, the time at which the correlation sample has the known relative thermal index RTI is extrapolated, and the temperature of the measurement sample obtained in the same time is defined as RTI (for example, refer to "Plastic" Vol. 52, No. 2, pp. 95 to 101). More specifically, a material having a known RTI is used as a correlation sample, and RTI is obtained by determining the change with time of the heat aging properties at a plurality of ambient temperatures based on the Arrhenius rule. Here, the known RTI of a correlation sample means the relative thermal index (RTI: Imp) specified in UL standards 746B defined by UNDERWRITERS LABORATORIES INC. (hereinafter referred to as "UL").

The connection structure used for a photovoltaic power generation module is generally expected to be used for a long period of time of several months to about 10 years, or even about 20 years. According to the service conditions and the like, the external highest temperature may exceed 90° C. From this viewpoint, the relative thermal index (RTI) of the thermoplastic resin composition at a thickness of 1.5 mm needs only to be 115° C. or higher, and is preferably 120° C. or higher, more preferably 122° C. or higher. The higher the RTI is, the higher the allowable service temperature of the connection structure is. However, from the viewpoint of balance with the moldability of the connection structure, the RTI as described above is preferably 160° C. or less, more preferably 155° C. or less, further preferably 150° C. or less.

When the connection structure of the present embodiments is used in an outdoor low temperature environment, it is desired that the connection structure not produce a crack even if a flying object collides. From this viewpoint, the Charpy impact strength at −40° C. may be 6.5 kJ/m$^2$ or more, preferably 7.0 kJ/m$^2$ or more, more preferably 7.5 kJ/m$^2$ or more.

In the present embodiments, the Dart impact strength of the thermoplastic resin composition at −40° C. (1 mm in thickness) is preferably 3.0 J or more. The connection structure of the present embodiments is preferably composed of a material which can endure an impact of 3.0 J or more, more preferably 3.5 J or more, further preferably 4.0 J or more, in the Dart impact test at −40° C. when it has a wall thickness of 1 mm.

If the connection structure has a reduced Charpy impact strength and Dart impact strength, it will be easily cracked by collision of a flying object particularly in a low temperature environment. Therefore, it is necessary to increase the wall thickness as the measure. As a result, the connection structure is restricted by design flexibility, reduction in space, a cost aspect, and the like. Further, when the connection structure has a wall thickness of less than 1 mm, the rigidity and strength of the molded article itself will be greatly reduced before trying to improve impact strength. Therefore, such a wall thickness is not practical. Higher Charpy impact strength and higher Dart impact strength are desired, however, if an elastomer component is increased in order to improve impact resistance, heat resistance and rigidity will be reduced. From the viewpoint of maintaining the balance of physical properties based on these facts, the Charpy impact strength of the thermoplastic resin composition is preferably 15 kJ/m² or less, more preferably 13 kJ/m² or less. From the same viewpoint, the Dart impact strength of the thermoplastic resin composition is preferably 15 J or less, more preferably 10 J or less.

Further, it is desired that the connection structure of the present embodiments have a resistance against a high humidity environment even if it is used outdoors for about 20 years. Particularly, it is practically important for the photovoltaic power generation module that the low-temperature impact strength after being exposed to an environment of high temperature and high humidity over a long period of time is good. From this viewpoint, the thermoplastic resin composition preferably has a retention of 65% or more, more preferably 70% or more, wherein the retention is defined as the ratio, in percentage, of the Dart impact strength at −40° C. after being left standing in a 90° C./saturated water vapor environment for 500 hours to the Dart impact strength at −40° C. before the standing.

Since the connection structure of the present embodiments is produced by injection molding, a thermoplastic resin is generally used as a material. The thermoplastic resin is not particularly limited, but a known thermoplastic resin can be used. Especially, from the viewpoint of strength, electric characteristics, and long-term heat resistance, preferred is a resin composition containing at least one selected from the group consisting of a modified polyphenylene ether, polycarbonate, a polymer alloy containing polycarbonate and ABS, polybutylene terephthalate, polyethylene terephthalate, and polyphenylene sulfide. A resin composition containing a modified polyphenylene ether is more preferred.

Generally, a junction box is often installed outdoors such as on the reverse side of a solar panel, and it is desired that the physical properties of the junction box be not reduced even if it is in a high temperature/high humidity environment. From this viewpoint, a modified polyphenylene ether is particularly suitable because it is excellent in hydrolysis resistance and shows little reduction in impact strength in an environment of high temperature and high humidity.

The thermoplastic resin composition preferably comprises a (A) polyphenylene ether, a (B) styrenic-based resin, and a (C) hydrogenated block copolymer, wherein based on 100 parts by mass of the total of the component (A), the component (B), and the component (C), the content of the component (A) is from 65 to 98 parts by mass; the content of the component (B) is from 1 to 25 parts by mass; and the content of the component (C) is from 1 to 20 parts by mass. By containing each of the above components (A) to (C) in the ratio as described above, heat resistance, impact resistance, and flame retardancy can be further improved, and the connection structure can have more excellent long-term heat resistance and low-temperature impact resistance.

The (A) polyphenylene ether is a homopolymer or a copolymer containing repeating units represented by formula (I) and/or formula (II). Examples of the homopolymer of polyphenylene ether may include poly(2,6-dimethyl-1,4-phenylene)ether, poly(2-methyl-6-ethyl-1,4-phenylene) ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene) ether, poly(2-ethyl-6-isopropyl-1,4-phenylene)ether, poly(2-methyl-6-chloroethyl-1,4-phenylene)ether, poly(2-methyl-6-hydroxyethyl-1,4-phenylene)ether, and poly(2-methyl-6-chloroethyl-1,4-phenylene)ether.

[Formula 1]

In formula (I) and formula (II), $R^1$, $R^2$, $R^3$, $R^4$, $R^5$, and $R^6$ each independently represent a hydrogen atom, an alkyl group having 1 to 4 carbon atoms, an aryl group having 6 to 9 carbon atoms, or a halogen atom; provided that $R^5$ and $R^6$ are not simultaneously hydrogen.

Examples of the copolymer of polyphenylene ether may include a copolymer of 2,6-dimethylphenol and 2,3,6-trimethylphenol, a copolymer of 2,6-dimethylphenol and o-cresol, and a copolymer of 2,6-dimethylphenol, 2,3,6-trimethylphenol, and o-cresol.

Among these polyphenylene ethers, poly(2,6-dimethyl-1,4-phenylene)ether is preferred from the viewpoint of ease in availability and economical efficiency. Also preferably used is a polyphenylene ether containing a 2-(dialkylaminomethyl)-6-methylphenylene ether unit, a 2-(N-alkyl-N-phenylaminomethyl)-6-methylphenylene ether unit, and the like as a substructure, as described in Japanese Patent Laid-Open No. 63-301222 and the like.

The (A) polyphenylene ether may be a modified polyphenylene ether in which a part or all of the polyphenylene ether is modified with an unsaturated carboxylic acid or a derivative thereof. The modified polyphenylene ether can be produced, for example, by subjecting polyphenylene ether and an unsaturated carboxylic acid or a derivative thereof to melt-kneading to allow them to react with each other in the presence or absence of a free-radical initiator. Alternatively, the modified polyphenylene ether can be produced by dissolving polyphenylene ether and an unsaturated carboxylic acid or a derivative thereof in an organic solvent to allow them to react with each other in the solution in the presence or absence of a free-radical initiator.

Examples of the unsaturated carboxylic acid or a derivative thereof may include, but are not limited to, maleic acid, fumaric acid, itaconic acid, halogenated maleic acid, cis-4-cyclohexene-1,2-dicarboxylic acid, and endo-cis-bicyclo(2,2,1)-5-heptene-2,3-dicarboxylic acid, and an anhydride, ester, and amide of these dicarboxylic acids. As a saturated carboxylic acid, a compound which itself can be thermally degraded at a reaction temperature in producing a modified polyphenylene ether and provides a derivative which can be used in the present embodiments can also be used. Specific examples of the saturated carboxylic acids may include malic acid, citric acid, and the like. These compounds may be used singly or in combination of two or more.

The content of the component (A) polyphenylene ether in the thermoplastic resin composition is not particularly limited, but is preferably in the range of from 65 to 98 parts by mass, more preferably from 70 to 95 parts by mass, further preferably from 75 to 93 parts by mass, further more preferably from 80 to 90 parts by mass, based on 100 parts by mass of the total of the components (A), (B), and (C). When the content of the polyphenylene ether is 65 parts by mass or more based on 100 parts by mass of the total of the components (A), (B), and (C), heat-resistant temperature will not be too low and long-term heat resistance will be excellent. When the content of the polyphenylene ether is 98 parts by mass or less based on 100 parts by mass of the total of the components (A), (B), and (C), melt viscosity during extrusion will not be too high and productivity can be further stabilized.

The (B) styrenic-based resin refers to a polymer obtainable by polymerizing a styrenic-based compound, or a styrenic-based compound and a compound copolymerizable with the styrenic-based compound in the presence or absence of a rubber polymer. Examples of the styrenic-based compound may include, but are not limited to, styrene, α-methylstyrene, 2,4-dimethylstyrene, monochlorostyrene, p-methylstyrene, p-tert-butylstyrene, and ethylstyrene. Especially, styrene is preferred from the viewpoint of compatibility with polyphenylene ether.

Examples of the compound copolymerizable with the styrenic compound may include, but are not limited to, methacrylates such as methyl methacrylate and ethyl methacrylate; unsaturated nitrile compounds such as acrylonitrile and methacrylonitrile; and acid anhydrides such as maleic anhydride. These are used with a styrenic-based compound. The amount of the copolymerizable compound used is not particularly limited, but is preferably 20% by mass or less, more preferably 15% by mass or less, based on the total amount of the copolymerizable compound and the styrenic-based compound.

Examples of the rubber polymer may include, but are not limited to, a conjugated diene rubber, a copolymer of a conjugated diene and an aromatic vinyl compound, and an ethylene-propylene copolymer rubber.

Specific examples of the styrenic-based resin may include polystyrene, a rubber-reinforced polystyrene, a styrene-acrylonitrile copolymer (AS resin), a rubber-reinforced styrene-acrylonitrile copolymer (ABS resin), and other styrenic-based copolymers.

The content of the (B) styrenic-based resin in the thermoplastic resin composition is not particularly limited, but is preferably in the range of from 1 to 25 parts by mass, more preferably from 1 to 15 parts by mass, further preferably from 1 to 10 parts by mass, based on 100 parts by mass of the total of the components (A), (B), and (C). In particular, when the connection structure is used under conditions where long-term heat resistance is required, the content of polystyrene is preferably in the range of from 1 to 25 parts by mass based on 100 parts by mass of the total of the components (A), (B), and (C).

The (C) hydrogenated block copolymer is a hydrogenated block copolymer of a block copolymer obtained by at least copolymerizing styrene and a diene compound. The hydrogenated block copolymer may be copolymerized with other monomers in the range which does not affect the performance. The degree of hydrogenation of unsaturated bonds derived from the diene compound is preferably 60% or more, more preferably 80% or more, further preferably 95% or more. Here, the degree of hydrogenation can be measured with a nuclear magnetic resonance apparatus (NMR).

When a styrene block chain is represented by "S" and a diene compound block chain is represented by "B" in the hydrogenated block copolymer, examples of the structure of the hydrogenated block copolymer may include S-B-S, S-B-S-B, (SB-)4-Si, and S-B-S-B-S. Further, the microstructure of a diene compound polymer block (for example, 1,2-vinyl bond, 1,4-vinyl bond, and the like) is not particularly limited and can be arbitrarily selected. Generally, the 1,2-vinyl bond is contained in the range of from 2 to 60%, preferably from 8 to 40%, based on all the bonds of the diene compound polymer. Here, the 1,2-vinyl bond can be measured with a nuclear magnetic resonance apparatus (NMR).

The percentage of the styrene polymer block of the (C) hydrogenated block copolymer in the whole copolymer is not particularly limited, but is preferably from 25 to 80% by mass, more preferably from 30 to 50% by mass, from the viewpoint of impact resistance.

In the (C) hydrogenated block copolymer, at least one styrene block chain preferably has a number average molecular weight of 15,000 or more, more preferably from 20,000 to 50,000. Further preferably, all the styrene block chains have a number average molecular weight of 15,000 or more. The number average molecular weight of the (C) hydrogenated block copolymer is not particularly limited, but is preferably 80,000 or more, more preferably from 150,000 to 400,000. Here, the number average molecular weight can be determined by measuring with gel permeation chromatography (GPC) using tetrahydrofuran as a mobile phase and calibrating with polystyrene having a known molecular weight for conversion. The (C) hydrogenated block copolymer may be used singly or in combination of two or more.

The content of the (C) hydrogenated block copolymer in the thermoplastic resin composition is not particularly limited, but is preferably in the range of from 1 to 20 parts by mass, more preferably from 3 to 10 parts by mass, further preferably from 3 to 8 parts by mass, based on 100 parts by mass of the total of the components (A), (B), and (C). When the content of the hydrogenated block copolymer is 1 part by mass or more, sufficient impact strength can be obtained. Further, when the content of the hydrogenated block copolymer is 20 parts by mass or less, excellent impact resistance can be obtained, as well as reduction in the retention of impact resistance after the heat aging can be prevented.

In the present embodiments, the thermoplastic resin composition preferably further comprises a (D) phosphoric ester. Flame retardancy can be improved by containing the (D) phosphoric ester. The phosphoric ester which can be used may include, but is not limited to, an organophosphate generally used as a flame retardant of the polyphenylene ether (A). Among them, a condensed phosphoric ester represented by following formula (III) or formula (IV) is preferred. The condensed phosphoric ester may be used singly or in combination of two or more.

[Formula 2]

(III)

(IV)

In formula (III) and formula (IV), $Q^1$, $Q^2$, $Q^3$, and $Q^4$ are each a substituent and each independently represent an alkyl group having 1 to 6 carbon atoms; $R^7$ and $R^8$ each independently represent a hydrogen atom or a methyl group; n represents an integer of 1 or more; $n^1$ and $n^2$ each independently represent an integer of 0 to 2; and $m^1$, $m^2$, $m^3$, and $m^4$ each independently represent an integer of 0 to 3.

In each of the condensed phosphoric esters represented by formula (III) and formula (IV), n is an integer of 1 or more, preferably an integer of 1 to 3.

Among these condensed phosphoric esters, it is preferred that, in formula (III), all of $m^1$, $m^2$, $m^3$, $m^4$, $n^1$, and $n^2$ be 0, and $R^7$ and $R^8$ be each a methyl group; and in formula (III), all of $Q^1$, $Q^2$, $Q^3$, $Q^4$, $R^7$, and $R^8$ be each a methyl group, $n^1$ and $n^2$ be 0, $m^1$, $m^2$, $m^3$, and $m^4$ be each independently an integer of 1 to 3; provided that n is in the range of 1 to 3. Among them, particularly more preferred are those containing 50% by mass or more of a phosphoric ester in which n is 1 in the (D) component. Commercially available flame retardants can also be used, and examples thereof may include the trade names of "CR-741", "CR733S" and "PX-200" manufactured by Daihachi Chemical Industry Co., Ltd. Specifically, bisphenol A bis(diphenyl phosphate) and resorcinol bis(diphenyl phosphate) are particularly preferred as phosphoric ester.

The content of the (D) phosphoric ester in the thermoplastic resin composition is not particularly limited and changes with the level of flame retardancy desired for the connection structure, but is preferably in the range of from 3 to 30 parts by mass, more preferably from 5 to 25 parts by mass, further preferably from 5 to 20 parts by mass, based on 100 parts by mass of the total of the (A), (B), and (C). When the content of phosphoric ester is 3 parts by mass or more, sufficient combustibility can be obtained. When the content is 30 parts by mass or less, not only flame retardancy but sufficient heat resistance can be obtained, and excellent balance of physical properties can be obtained.

In the present embodiments, the thermoplastic resin composition preferably further comprises (E) polyolefin. The thermoplastic resin composition containing polyolefin can have a further improved heat resistance. Examples of the (E) polyolefin may include, but are not limited to, low density polyethylene, high density polyethylene, linear low density polyethylene, polypropylene, an ethylene-propylene copolymer, an ethylene-butene copolymer, an ethylene-octene copolymer, and an ethylene-acrylic ester copolymer. Among these, low density polyethylene and an ethylene-propylene copolymer are preferred from the viewpoint to heat resistance. Generally, an ethylene-propylene copolymer, an ethylene-butene copolymer, an ethylene-octene copolymer, and an ethylene-acrylic ester copolymer are amorphous or low-crystalline copolymers. These copolymers may be copolymerized with other monomers in the range which does not affect the performance. The component ratio of ethylene to propylene, butene or octene is not particularly limited, but the component ratio of ethylene to each of propylene, butene, and octene in the copolymer is generally in the range of from 5 to 50 mol %. These polyolefins may be used singly or in combination of two or more.

The melt flow rate (MFR) of the (E) polyolefin as measured at a cylinder temperature of 230° C. according to ASTM D-1238 is not particularly limited, but is preferably from 0.1 to 50 g/10 minutes, more preferably from 0.2 to 20 g/10 minutes. The compatibility with the (C) component can be improved by using (E) polyolefin having an MFR in the above numerical value range.

The content of the (E) polyolefin in the thermoplastic resin composition is not particularly limited, but is preferably in the range of 0.5 to 5 parts by mass, more preferably 0.1 to 3 parts by mass, further preferably 0.5 to 2 parts by mass, based on 100 parts by mass of the total of the components (A), (B), and (C), from the viewpoint of the dispersibility in the components (A) and (B).

A high strength material in which fluidity and heat resistance are further improved can be obtainable by blending inorganic fillers such as glass fiber, glass flakes, kaolin clay, and talc, other fibrous reinforcing agents, and the like in the thermoplastic resin composition. Further, other additives can be added to the thermoplastic resin composition in the range which does not impair the effect of the present embodiments in order to further impart other characteristics to the thermoplastic resin composition. Here, examples of the other additives may include a plasticizer, an antioxidant, various stabilizers, an antistatic agent, a release agent, dyes and pigments, and other resins. Further, flame retardancy can be further improved by blending other conventionally known flame retardants and flame retardant auxiliaries. Examples of the other flame retardants and flame retardant auxiliaries may include hydroxides containing water of crystallization such as magnesium hydroxide and aluminum hydroxide; zinc borate compounds; zinc stannate compounds; and inorganic silicon compounds such as silica, kaolin clay, and talc.

The production method of the thermoplastic resin composition is not particularly limited, and a known production method suitable for each case may be used. When a polyphenylene ether powder is used for producing the thermoplastic resin composition, a twin-screw extruder having a non-melt mixing zone is employed. The non-melt mixing zone preferably has a length of from 45 to 75% of the total length of the barrel of the twin-screw extruder from the upstream end of the barrel, wherein the total length of the barrel is defined as 100%. Here, the non-melt mixing zone refers to a zone in which the melting of a polyphenylene ether powder is suppressed and mixed with other raw materials in the state where the polyphenylene ether powder is not completely melted, and the mixture is conveyed to the downstream of the barrel. The ratio of the length of the non-melt mixing zone to the total length of the barrel is not particularly limited, but is preferably from 50 to 70%, more preferably from 60 to 70%.

The ratio of the length of the non-melt mixing zone to the total length of the barrel is preferably 45% or more from the viewpoint of the retention of physical properties, production stability and the like of the thermoplastic resin composition. The ratio of the length of the non-melt-kneading zone to the total length of the barrel is preferably 75% or less from the viewpoint of sufficient melt-kneading of the thermoplastic resin composition, and from the viewpoint of ensuring a vacuum deaeration zone and an addition zone for feeding from a second feed port.

The extrusion screws of the non-melt mixing zone preferably have a screw configuration which provides a low shear and good conveying efficiency of a powder component by using feed screw elements such as single-threaded right-handed screw elements and double-threaded right-handed screw elements. In particular, from the viewpoint of improving conveying efficiency of a powder component, it is preferred to use the single-threaded right-handed screw elements and double-threaded right-handed screw elements, in which the ratio (L/D) of the length (L) of the screw element to the screw diameter (D) is from 1.0 to 3.0.

A melt-kneading zone for sufficiently kneading the polyphenylene ether powder and other raw materials is provided after the non-melt mixing zone. The ratio of the length of the melt-kneading zone to the total length of the barrel is not particularly limited, but is preferably from 5 to 30%, more preferably from 8 to 20%. Here, the melt-kneading zone means a zone for carrying out kneading by appropriately incorporating screw elements as described below in the screw configuration as the screw elements used for kneading resins, wherein the screw elements to be incorporated may include the kneading disc R (the right-handed screw element having from 3 to 7 discs combined with a twist angle of from 15 to 75 degrees and an L/D of from 0.5 to 2.0), the kneading disc N (the neutral screw element having from 3 to 7 discs combined with a twist angle of 90 degrees and an L/D of from 0.5 to 2.0), the kneading disc L (the left-handed screw element having from 3 to 7 discs combined with a twist angle of from 15 to 75 degrees and an L/D of from 0.5 to 1.0), the left-handed screw (the double-threaded left-handed screw element having an L/D of from 0.5 to 1.0), the SME screw (the screw element having good kneading properties by forming a notch to the right-handed screw and an L/D of from 0.5 to 1.5), and the ZME screw (the screw element having good kneading properties by forming a notch to the left-handed screw and an L/D of from 0.5 to 1.5). The melt-kneading zone can also be dividedly provided in two or more parts if needed. Even when providing two or more melt-kneading zones, the ratio of the total length of the melt-kneading zones to the whole barrel length is preferably from 5 to 30%. It is preferred to use feed screw elements such as double-threaded right-handed screw elements each having an L/D of from 0.5 to 3.0 as the remaining screw elements other than the non-melt mixing zone and melt-kneading zone.

After the melt-kneading zone, it is preferred to provide a vacuum deaeration zone for removing a volatile constituent and a degraded material from the molten resin. The screw of the vacuum deaeration zone preferably has a screw configuration which provides a low shear by using feed screw elements such as double-threaded right-handed screws. The vacuum deaeration zone is preferably provided with a decompression vent port to decompress to −600 mmHg or less. Two or more decompression vent ports may be installed in the vacuum deaeration zone. Further, a second feed port may be provided, if needed, to add a flame retardant, an impact modifier, an additive, an inorganic filler, and the like. It is preferred to use feed screw elements such as double-threaded right-handed screws as the screw of the second feed port.

The barrel temperature of the non-melt mixing zone is not particularly limited, but is preferably set to 280° C. or lower. The barrel of the first feed port for feeding raw materials is more preferably cooled with water so as to cool the first 30% of the barrel length to a barrel temperature of 200° C. or lower. The barrel temperature from the melt-kneading zone to the extruder exit is preferably set to from 240 to 330° C., more preferably from 250 to 300° C., further preferably from 260 to 290° C. Degradation of resin can be prevented by setting the barrel temperature to 330° C. or lower. By setting the barrel temperature to 240° C. or higher, it is possible to properly melt the polyphenylene ether powder, to prevent the reduction in mechanical properties, to prevent the torque during extrusion from increasing too much, and to prevent the extruder from stopping due to an excessively high torque.

The screw rotation speed of the extruder is not particularly limited, but is preferably from 150 to 600 rpm, more preferably from 200 to 500 rpm, further preferably from 300 to 450 rpm. It is possible to sufficiently knead the polyphenylene ether powder with other raw materials by setting the screw rotation speed to 150 rpm or more. An extreme increase of resin temperature can be suppressed and the performance reduction of the extruder can be prevented by setting the screw rotation speed to 600 rpm or less.

In the production method of the thermoplastic resin composition, the temperature of the thermoplastic resin composition extruded from the exit of the die is not particularly limited, but is preferably controlled to lower than 380° C. The deterioration and degradation of resin can be prevented, and the reduction in mechanical properties, impact resistance after exposure to heat, and the like can be prevented by setting the resin temperature to 380° C. or lower. The temperature of the thermoplastic resin composition is more preferably 320 to 370° C., further preferably 330 to 360° C.

In order to suppress the resin temperature to 380° C. or lower, the lengths of the non-melt mixing zone and the melting zone, a screw configuration, barrel preset temperature, screw rotation speed, and the like may be appropriately adjusted depending on the quantitative ratio and type of the resin composition.

In the production method of the thermoplastic resin composition, the method of supplying the (D) phosphoric ester is not particularly limited, but a known method may be used for it.

When the phosphoric ester is a liquid, it is preferred that the (A) polyphenylene ether powder, the (B) styrenic-based resin, and the (C) hydrogenated block copolymer be fed from the first raw material feed port located in the upstream of the extruder, and then the phosphoric ester be side-fed from the second raw material feed port located in the downstream of the first raw material feed port. More preferred is a method of providing a second raw material feed port in the non-melt mixing zone which prevents the (A) polyphenylene ether powder from melting, and the phosphoric ester is side-fed from the second raw material feed port. When the phosphoric ester is fed from the non-melt mixing zone, the liquid phosphoric ester is preferably mixed with the polyphenylene ether powder using the kneading disc R (the right-handed screw element having from 3 to 7 discs combined with a twist angle of from 15 to 75 degrees and an L/D of from 1.0 to 1.5) within the range which does not melt the polyphenylene ether.

The method of side-feeding the liquid phosphoric ester is not particularly limited. For example, the liquid phosphoric ester can be fed from an injection nozzle into the side of the extruder using a gear pump, a plunger pump, or the like.

When the phosphoric ester is a solid, it may be fed from the first feed port located in the upstream of the extruder along with other components or may be side-fed from the feed port provided in the downstream of the first feed port.

General production methods of the connection structure may include injection molding, forming by cutting from a thick plate, and the like, but injection molding is preferred from the viewpoint of mass production. Particularly, when a junction box is produced by injection molding, from the viewpoint of impact resistance and dimensional accuracy, it is preferred to reduce weld lines generated when the streams of the molten resin join from a plurality of directions, and to select a gate location of resin filling so that the resin can be filled in the state where the pressure is sufficiently applied also to a flow end or a portion into which the resin is hard to flow such as a claw part or a thin-walled part. Further, from the viewpoint of waterproofness and attachment to photovoltaic power generation modules, it is preferred to provide a shape that is hard to generate sinkage and warpage which impair the surface smoothness and dimensional accuracy of the connection structure in order to ensure fitting and joining to connectors and other parts.

When a connector is produced, injection molding is preferred as a production method, similar to the junction box. A structure and a production method in which weld lines are reduced and a gate location of resin filling is suitably selected are preferred from the viewpoint of impact resistance and dimensional accuracy, and a shape that is hard to generate sinkage and warpage is particularly preferred from the viewpoint of ensuring waterproofness and insulation properties.

EXAMPLES

Hereinafter, the present invention will be described in detail based on Examples, but the present invention is not limited to the following Examples. The materials used in Examples and Comparative Examples are as follows.
(A) Polyphenylene Ether (PPE) Powder
  Poly-2,6-dimethyl-1,4-phenylene ether having a reduced viscosity of 0.48 dL/g as measured in a chloroform solution at 30° C.
(B) Styrenic-Based Resin
(B-1) Polystyrene (GPPS)
  Polystyrene: trade name "685", manufactured by PS Japan Corporation
(B-2) Rubber Reinforced Polystyrene (HIPS)
  High impact polystyrene: trade name "H9405", manufactured by PS Japan Corporation
(C) Hydrogenated Block Copolymer
  A hydrogenated styrene block copolymer having two styrene block chains each having a number average molecular weight of 41,000, an S-B-S-B structure including 33% of a 1,2-vinyl structure, 33% by mass of a styrene polymer block, a degree of hydrogenation of butadiene units of 99%, and a number average molecular weight of 250,000.
(D) Phosphoric Ester
  Condensed phosphoric ester: trade name "CR-741", manufactured by Daihachi Chemical Industry Co., Ltd.
(E) Polyolefin
  Low density polyethylene: trade name "M 2004", manufactured by Asahi Kasei Chemicals Corporation
(F) Heat Stabilizer
(F-1) Hindered phenol-based heat stabilizer: trade name "Irganox 565", manufactured by Ciba Specialty Chemicals Corporation
(F-2) Phosphite-based antioxidant: trade name "PEP 36", manufactured by ADEKA Corporation
(F-3) Phosphorus-based heat stabilizer: trade name "IRGFOS 168", manufactured by Ciba Specialty Chemicals Corporation
(G) Polycarbonate resin: trade name "Novarex 7025R", manufactured by Mitsubishi Engineering-Plastics Corporation
(H) Composite rubber-based graft copolymer: trade name "Metablen SRK200", manufactured by Mitsubishi Rayon Co., Ltd.
(I) Polyphenylene sulfide resin: a polyphenylene sulfide having a linear structure in which the melt viscosity (a value measured after holding for 6 minutes at 300° C., a load of 2 MPa, and an L/D=10/1 using a flow tester) is 500 poise; the amount of extraction with methylene chloride is 0.4% by weight; and the amount of an —SX group is 29 μmol/g.
(J) Fibrous reinforcing filler: trade name "RES 03-TPO 15", manufactured by Nippon Sheet Glass Co., Ltd.
(K) Impact modifier: trade name "Bondfast 2C", manufactured by Sumitomo Chemical Co., Ltd.

Example 1

The thermoplastic resin composition was obtained on the extrusion conditions as described in Table 1. The materials used are as follows.
(A) Polyphenylene Ether (PPE) Powder: 87 Parts by Mass
  Poly-2,6-dimethyl-1,4-phenylene ether having a reduced viscosity of 0.48 dL/g as measured in a chloroform solution at 30° C.
(B-1) Polystyrene (GPPS): 7 Parts by Mass
  Polystyrene: trade name "685", manufactured by PS Japan Corporation
(C) Hydrogenated Block Copolymer: 6 Parts by Mass
  A hydrogenated styrene block copolymer having two styrene block chains each having a number average molecular weight of 41,000, an S-B-S-B structure including 33% of a 1,2-vinyl structure, 33% by mass of a styrene polymer block, a degree of hydrogenation of butadiene units of 99%, and a number average molecular weight of 250,000.
(D) Phosphoric Ester: 14 Parts by Mass
  Condensed phosphoric ester: trade name "CR-741", manufactured by Daihachi Chemical Industry Co., Ltd.
(E) Polyolefin: 0.1 Parts by Mass
  Low density polyethylene: trade name "M 2004", manufactured by Asahi Kasei Chemicals Corporation
(F-1) "IRGANOX 565": 0.6 Parts by Mass
  Hindered phenol-based heat stabilizer: trade name "IRGANOX 565", manufactured by Ciba Specialty Chemicals Corporation
(F-2) "PEP 36: 0.6 Parts by Mass
  Phosphite-based antioxidant: trade name "PEP 36", manufactured by ADEKA Corporation
  When the composition containing the materials as described above was melt-kneaded using a twin screw extruder having a screw diameter of 58 mm and a 13-barrel decompression vent ("ZSK58MC", manufactured by Werner & Pfleiderer GmbH, Germany), the (A) polyphenylene ether powder, the (B-1) polystyrene, the (C) hydrogenated block copolymer, the (E) polyolefin, (F-1) "IRGANOX 565", and (F-2) "PEP 36" were fed from the first feed port located in the barrel 1 in the upstream relative to the machine direction of the extruder. Then, the (D) phosphoric ester was fed from an injection nozzle to the side of the extruder using a gear pump from the second feed port located in the downstream from the first feed port. The resulting resin composition was extruded. The extruded strand was cooled and cut to obtain resin composition pellets. Test pieces were produced from the resin composition pellets and evaluated for various physical properties.

Note that, with respect to the screw configuration of the extruder, 65% of the whole barrel length was used as the non-melt mixing zone, and 12% of the remaining barrel length, which is 35% of the whole barrel length, was used as the melting kneading zone. The resin composition was extruded under the following conditions: a vacuum deaeration zone was provided in the barrel 11 to perform deaeration at −670 mmhg; the second feed port to feed the phosphoric ester was provided in the barrel 12; the barrel preset temperatures were as follows: barrel 1: water-cooling, barrel 2: 100° C., barrel 3: 150° C., barrels 4 and 5: 200° C., barrel 6: 250° C., barrels 7 to 10: 280° C., and barrels 11 to 13: 270° C.; the die was set to 320° C.; the screw rotation speed was set to 400 rpm; and the discharge rate was set to 300 kg/hr. The single-threaded right-handed screw (L/D=1.0) and the double-threaded right-handed screw were used for the non-melt mixing zone. In the melt-kneading zone, there was used a combination of the kneading disc R (the right-handed screw element having 5 discs combined with a twist angle of 45 degrees and an L/D=1.0), the kneading disc N (the flighted screw element having 5 discs combined with a twist angle of 90 degrees and an L/D=1.0), and the left-handed screw element (the double-threaded left-handed screw element having an L/D=0.52). The left-handed screw (the double-threaded left-handed screw element having an L/D=0.52) was used between the vacuum deaeration zone and the feed port of the phosphoric ester, and the kneading disc R (L/D=1.0) and the SME screw (L/D=0.69) were used after feeding the phosphoric ester. The length % of the non-melting zone and the melting zone means the screw configuration, and the ratio (%) of the length of the non-melting zone to the length of the melting zone can be adjusted by changing the screw configuration as shown in Table 1.

(RTI Using the Heat Aging Resistance Measurement)

The tensile impact test piece having a thickness of 1.5 mm prepared according to ASTM D1822 was left standing in the air circulation oven set at 160° C., 150° C., 140° C., 130° C., or 120° C., and the aging time until the tensile impact strength reaches 50% of the initial value was measured according to the standard. Then, "Xyron™ SZ800" was used as a correlation sample. For the correlation sample, the time until the initial value of the tensile impact reaches 50% was plotted at 150° C., 140° C., 130° C., or 120° C., and the temperature in the aging time extrapolated to the known RTI (110° C.) specified by UL 746B was determined, and this temperature was used as RTI.

(Low-Temperature Charpy Impact)

The low-temperature Charpy impact was measured according to ISO 179/1eA which is a Charpy impact test standard. The low-temperature Charpy impact was measured in a −40° C. environment using a Charpy impact tester "258-PLA" manufactured by Yasuda Seiki Seisakusho Ltd.

(Low-Temperature Dart Impact Test)

The injection-molded test piece (70 mm in length×70 mm in width, and 1 mm in thickness) which was left standing for 5 hours in a constant temperature bath at −40° C. was measured for the low-temperature Dart impact using a drop impact tester "5H.V." manufactured by Rosand Precision Ltd. The test piece was inserted and fixed in a cylinder having a diameter of 50 mm, and a striker having a diameter of 10 mm and a weight of 3.2 kg was dropped from a height of 1.9 m to the center of the flat plate, thus measuring the breaking energy of the test piece.

(Moisture Resistance Evaluation)

The injection-molded test piece (70 mm in length×70 mm in width, and 3 mm in thickness) was subjected to the Dart impact test before and after the test piece is left standing in a 90° C. and saturated humidity environment for 500 hours, and the retention of the Dart impact was evaluated. First, the Dart impact strength at −40° C. of the test piece before the standing was measured in the same manner as in the low-temperature Dart impact test. Then, a 90° C. and saturated humidity environment was made using a pressure cooker (manufactured by KYOSIN ENGINEERING CORPORATION), and the above test piece was left standing in the environment for 500 hours. Subsequently, the Dart impact strength at −40° C. of the test piece after the standing was measured on the same conditions as in the low-temperature Dart impact test. Further, the percentage (retention, %) of the Dart impact strength at −40° C. of the test piece after the standing relative to the Dart impact strength at −40° C. of the test piece before the standing was determined.

(Box Evaluation)

A box-shaped (10 mm in height×70 mm in width×110 mm in length, and 2 mm in wall thickness) molded article, on the top surface of which is formed one side gate (5 mm×1 mm), was obtained by injection molding. A 120° C., saturated humidity environment was made using a pressure cooker (manufactured by KYOSIN ENGINEERING CORPORATION), and the above test piece was left standing in the environment for 100 hours. Subsequently, the dimension and Dart impact strength of the molded article were measured. With respect to the dimension, the length, the width, and the height before and after the standing were measured. The case where any of the dimensional changes were less than 1% was evaluated as "A"; the case where any of the dimensional changes was 1 to 5% was evaluated as "B"; and the case where any of the dimensional changes was larger than 5% was evaluated as "C". The low-temperature Dart impact test was performed using a film impact tester (manufactured by Toyo Seiki Seisaku-sho, Ltd.), wherein, at −40° C., the top surface of the above molded article was struck by an iron striker having a diameter of 13 mm which was given an energy of 3 J. Three samples were tested on the same conditions and evaluated for the fracture forms. The case where all three samples deformed or formed a non-through crack was evaluated as "A"; the case where at least one of the three samples formed a through crack was evaluated as "B"; and the case where all three samples formed a through crack was evaluated as "C".

Examples 2 to 5

The pellets were produced in the same manner as in Example 1 except that the formulations shown in Table 2 were used, and the resulting pellets were tested for the physical properties thereof.

Example 6

The pellets were produced in the same manner as in Example 1 except that there were used the formulation shown in Table 2 and a twin screw extruder (ZSK-40; manufactured by Werner & Pfleiderer GmbH, Germany) set to a temperature of 260° C. and a screw rotation speed of 150 rpm, and the resulting pellets were tested for the physical properties thereof.

Example 7

The pellets were produced in the same manner as in Example 1 except that there were used the formulation shown in Table 2 and a twin screw extruder (ZSK-40; manufactured by Werner & Pfleiderer GmbH) set to a temperature of 300° C. and a screw rotation speed of 500 rpm, and the resulting pellets were tested for the physical properties thereof.

Comparative Examples 1 and 2

The pellets were produced in the same manner as in Example 1 except that the formulations shown in Table 3 were used, and the resulting pellets were tested for the physical properties thereof.

Comparative Example 3

The test was performed using "LEXAN® 940" manufactured by SABIC Innovative Plastics for the test piece.

Comparative Example 4

The test was performed using "Xyron™ 540Z" manufactured by Asahi Kasei Chemicals Corporation for the test piece.

Reference Example

The tensile impact test after aging was performed using "Xyron™ SZ800" manufactured by Asahi Kasei Chemicals Corporation for the test piece.

The production conditions of Examples, Comparative Examples, and Reference Example and the evaluation results of the physical properties thereof are shown in Tables 2 and 3.

TABLE 1

| Extrusion conditions | | | |
|---|---|---|---|
| Screw configuration | Non-melting zone | | 65% |
| | Melting zone | | 12% |
| Liquid-adding position | Barrel | | 12 |
| Screw rotation speed | PPM | | 400 |
| Discharge rate | Kg/Hr | | 300 |
| Screw configuration | Barrel 1 | | |
| | Barrel 2 | | |
| | Barrel 3 | | |
| | Barrel 4 | | |
| | Barrel 5 | | |
| | Barrel 6 | | |
| | Barrel 7 | | |
| | Barrel 8 | | |
| | Barrel 9 | | R, R, N, L |
| | Barrel 10 | | |
| | Barrel 11 | | |
| | Barrel 12 | | Reverse |
| | Barrel 13 | | R, S, S |
| Barrel temperature ("B": Vacuum vent) ("Liquid": Liquid addition) | Barrel 1 | | Water-cooling |
| | Barrel 2 | | 100° C. |
| | Barrel 3 | | 150° C. |
| | Barrel 4 | | 200° C. |
| | Barrel 5 | | 200° C. |
| | Barrel 6 | | 250° C. |
| | Barrel 7 | | 280° C. |
| | Barrel 8 | | 280° C. |
| | Barrel 9 | | 280° C. |
| | Barrel 10 | | 280° C. |
| | Barrel 11 | | 270° C., B |
| | Barrel 12 | | 270° C., Liquid |
| | Barrel 13 | | 270° C. |
| Resin temperature | Die outlet temperature | | 357° C. |

The abbreviations used in the screw configuration of Table 1 are as follows.
Blank: Combination of single-thread feed and double-thread feed
R: Kneading disc (right) (L/D=1.0)
N: Kneading disc (neutral) (L/D=1.0)
L: Kneading disc (left) (L/D=0.52)
Reverse: Left-handed screw (L/D=0.52)
S: SME screw (L/D=0.69)
In the barrels 9 and 10, two kneading discs (right), one kneading disc (neutral), and one kneading disc (left) were used in this order. In the barrel 13, one kneading disc (right) and two SME screws were used in this order.

TABLE 2

| Resin material (composition: parts by mass) | | | Example 1 | Example 2 | Example 3 | Example 4 | Example 5 | Example 6 | Example 7 |
|---|---|---|---|---|---|---|---|---|---|
| A | | | 87 | 90 | 70 | 81 | 87 | — | — |
| B-1 | | | 7 | 5 | 24 | 10 | 4 | — | — |
| B-2 | | | — | — | — | — | — | — | — |
| C | | | 6 | 5 | 6 | 9 | 9 | — | — |
| D | | | 14 | 11.5 | 6 | 14 | 14 | — | — |
| E | | | 0.1 | 0.1 | 0.1 | 0.1 | 0.1 | — | — |
| F-1 | | | 0.6 | 0.6 | 0.6 | 0.6 | 0.6 | — | — |
| F-2 | | | 0.6 | 0.6 | 0.6 | 0.6 | 0.6 | — | — |
| F-3 | | | — | — | — | — | — | — | — |
| G | | | — | — | — | — | — | 90 | — |
| H | | | — | — | — | — | — | 10 | — |
| I | | | — | — | — | — | — | — | 60 |
| J | | | — | — | — | — | — | — | 40 |
| K | | | — | — | — | — | — | — | 10 |
| Time to 50% retention of tensile impact strength after aging | 160° C. | Hours | 1300 | 750 | — | — | 750 | — | >3000 |
| | 150° C. | | 1500 | 1500 | 1000 | 250 | 1300 | — | — |
| | 140° C. | | 2500 | 3200 | 1600 | 550 | 1750 | 450 | — |
| | 130° C. | | — | — | 1900 | 950 | — | 900 | — |
| | 120° C. | | — | — | — | 1950 | — | 1800 | — |
| RTI (tensile impact, 1.5 mm in thickness) | | ° C. | 137 | 143 | 122 | 116 | 132 | 115 | >160 |
| RTI (Imp) by UL | | ° C. | — | — | — | — | — | — | — |

TABLE 2-continued

| Resin material (composition: parts by mass) | | Example 1 | Example 2 | Example 3 | Example 4 | Example 5 | Example 6 | Example 7 |
|---|---|---|---|---|---|---|---|---|
| −40° C. Charpy impact strength | kJ/m$^2$ | 7 | 8 | 8 | 9 | 11 | 8 | 7 |
| −40° C. Dart impact strength, 3 mm in thickness 0 hr | J | 25 | 18 | 14 | 21 | 31 | 38 | 7 |
| After 500 hour/90° C. immersion (retention %) 500 h | | 18 (72%) | 14 (78%) | 10 (71%) | 14 (67%) | 25 (81%) | 27 (71%) | 6 (86%) |
| −40° C. Dart impact strength, flat plate 1 mm in thickness | J | 5 | 4 | 4 | 6 | 6 | 12 | 4 |
| Box evaluation (after 120° C./100-hour immersion) | Dimension | A | A | A | B | A | B | A |
| | Impact strength | A | A | A | A | A | A | B |

TABLE 3

| Resin material (composition: parts by mass) | | Comparative Example 1 | Comparative Example 2 | Comparative Example 3 | Comparative Example 4 | Reference Example |
|---|---|---|---|---|---|---|
| A | | 87 | 60 | — | — | — |
| B-1 | | — | 24 | | | |
| B-2 | | 13 | 10 | | | |
| C | | — | 6 | | | |
| D | | 14 | 14 | | | |
| E | | 0.1 | 1.5 | | | |
| F-1 | | 0.6 | — | | | |
| F-2 | | 0.6 | — | | | |
| F-3 | | — | 0.8 | | | |
| G | | — | — | | | |
| H | | — | — | | | |
| I | | — | — | | | |
| J | | — | — | | | |
| K | | — | — | | | |
| Time to 50% retention tensile impact strength after aging | 160° C. Hours | — | Impossible to measure due to large deformation | — | — | — |
| | 150° C. | 350 | | — | — | 650 |
| | 140° C. | 600 | | — | — | 900 |
| | 130° C. | 1100 | | — | 500 | 1300 |
| | 120° C. | 1600 | | — | 1500 | 1800 |
| RTI (tensile impact, 1.5 mm in thickness) | ° C. | 112 | <112 | — | 104 | — |
| RTI (Imp) by UL | ° C. | — | — | 120 | 105 | 110 |
| −40° C. Charpy impact strength | kJ/m$^2$ | 5 | — | 6 | 5 | — |
| −40° C. Dart impact strength, 3 mm in thickness 0 hr | J | 8 | 11 | 42 | 14 | — |
| After 500-hour/90° C. immersion (retention %) 500 h | | 5 (62%) | 6 (55%) | 2 (5%) | 8 (57%) | — |
| −40° C. Dart impact strength, flat plate 1 mm in thickness | J | 2 | 3 | 6 | 2 | — |
| Box evaluation (after 120° C./100-hour immersion) | Dimension | A | B | C | A | — |
| | Impact strength | C | C | C | C | — |

As described above, according to the present Examples, it has been shown that the connection structure for the photovoltaic power generation module in accordance with the present embodiments is excellent in long-term heat resistance and is excellent in low-temperature impact resistance even if the structure is reduced in wall thickness and size.

The present application is based on the Japanese Patent Application (Japanese Patent Application No. 2008-274459) which was filed with the Japan Patent Office on Oct. 24, 2008, and the contents are incorporated herein by reference.

INDUSTRIAL APPLICABILITY

The connection structure for a photovoltaic power generation module in accordance with the present invention can be suitably used as a junction box case, a connector, and the like for a photovoltaic power generation module.

REFERENCE SIGNS LIST 1, 2 Connection structure
10 Body
12 Lid
102 Connection part for connecting to cable of photovoltaic power generation module
104 Connection part for connecting to external connection cable
20 First connector
22 Second connector
202, 222 Socket part
204 Connection Terminal
206 Lock Part
208, 228 Cable
224 Fitting hole
226 Lock-receiving Part

What is claimed is:

1. A junction box for a photovoltaic power generation module, which at least joins a photovoltaic power generation module to a cable for connecting to the photovoltaic power generation module, the connection structure for the photovoltaic power generation module comprising a thermoplastic resin composition having, as an index of long-term heat resistance, a relative thermal index (RTI) of tensile impact strength at a thickness of 1.5 mm of 115 degree C. or higher, and a Charpy impact strength at −40 degree C. of 6.5 kJ/m$^2$ or more and 15kJ/m$^2$ or less,
 wherein the thermoplastic resin composition comprises a
  (A) polyphenyiene ether, a (B) styrenic-based resin and a (C) hydrogenated block copolymer, and
 the junction box has an average wall thickness of 3mm or less.

2. The junction box for a photovoltaic power generation module according to claim 1, wherein the thermoplastic resin composition comprises a (A) polyphenylene ether, a (B) styrenic-based resin, and a (C) hydrogenated block copolymer, and
 based on 100 parts by mass of a total of the (A), the (B), and the (C),
 a content of the (A) is from 65 to 98 parts by mass;
 a content of the (B) is from 1 to 25 parts by mass; and
 a content of the (C) is from 1 to 20 parts by mass.

3. The junction box for a photovoltaic power generation module according to claim 1 or 2, wherein the thermoplastic resin composition has a relative thermal index of 120 degree C. or higher.

4. The junction box for a photovoltaic power generation module according to claim 1 or 2, wherein the thermoplastic resin composition has a Charpy impact strength at −40 degree C. of 7.5 kJ/m$^2$ or more.

5. The junction box for a photovoltaic power generation module according to claim 1 or 2, wherein the thermoplastic resin composition has a Dart impact strength at −40 degree C. of 3.0 J or more.

6. The junction box for a photovoltaic power generation module according to claim 1 or 2, wherein the thermoplastic resin composition has a retention of 70% or more, wherein the retention is defined as a ratio, in percentage, of the Dart impact strength at −40 degree C. after being left standing in a 90 degree C./saturated water vapor environment for 500 hours to the Dart impact strength at −40 degree C. before the standing.

7. The junction box for a photovoltaic power generation module according to claim 1, wherein the junction box has an average wall thickness of 1 mm or more and 2.5 mm or less.

8. The junction box for a photovoltaic power generation module according to claim 1 or 2, wherein the junction box for a photovoltaic power generation module comprises a male connector and a female connector.

9. The junction box for a photovoltaic power generation module according to claim 8, wherein the junction box has an average wall thickness of 0.5 mm or more and 2.5 mm or less.

10. The junction box for a photovoltaic power generation module according to claim 1, wherein the thermoplastic resin composition comprises at least one member selected from the group consisting of polyphenylene ether, polycarbonate, a polymer alloy containing polycarbonate and ABS, polybutylene terephthalate, polyethylene terephthalate, and polyphenylene sulfide.

11. The junction box for a photovoltaic power generation module according to claim 1, wherein the thermoplastic resin composition comprises at least one member selected from the group consisting of polyphenylene ether, polycarbonate, and polyphenylene sulfide.

* * * * *